(12) United States Patent
Brink et al.

(10) Patent No.: US 7,584,328 B2
(45) Date of Patent: Sep. 1, 2009

(54) METHOD, APPARATUS, AND A SYSTEM FOR EFFICIENT CONTEXT SWITCH

(75) Inventors: Peter C. Brink, Tempe, AZ (US); Shrikant M. Shah, Chandler, AZ (US); Peter R. Munguia, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 193 days.

(21) Appl. No.: 11/273,809

(22) Filed: Nov. 14, 2005

(65) Prior Publication Data
US 2007/0113018 A1    May 17, 2007

(51) Int. Cl.
*G06F 12/02* (2006.01)
(52) U.S. Cl. .................... 711/137; 711/204
(58) Field of Classification Search ........... 711/137, 711/204
See application file for complete search history.

(56) References Cited

U.S. PATENT DOCUMENTS 5,481,684 A * 1/1996 Richter et al. ............. 712/212
6,662,297 B1 * 12/2003 Boom et al. ............... 712/245
7,213,137 B2 * 5/2007 Boom et al. ............... 712/245

OTHER PUBLICATIONS

U.S. Appl. No. 11/171,862, Shah, et al.

* cited by examiner

*Primary Examiner*—Kevin L Ellis
*Assistant Examiner*—Hamdy S Ahmed
(74) *Attorney, Agent, or Firm*—Caven & Aghevli LLC

(57) ABSTRACT

A discussion of a local memory with at least a command block section and a cache section that facilitates an efficient interrupt processing. The command-block section is allocated on a per interrupt basis and contains pointers to cache-lines. When an interrupt is recognized an interrupt, the proposal uses the pointers in the command-block to prefetch the corresponding cache-lines from the cache section of the local memory, which it loads into its local cache buffer. Thus, when the CPU recognizes an interrupt, the information for the context-switch is already available in cache.

20 Claims, 3 Drawing Sheets

METHOD, APPARATUS, AND A SYSTEM FOR EFFICIENT CONTEXT SWITCH

FIELD OF THE INVENTION

One or more embodiments of the invention relate generally to the field improving context switch performance. More particularly, one or more of the embodiments of the invention relates to a method, system, and an apparatus for efficient context switch for interrupt processing, task, or process switching.

BACKGROUND OF THE INVENTION

Modem computer systems are capable of executing various applications in parallel and require the ability to perform a context switch to allow for handling of an interrupt, task, or process switching. However, a significant bottleneck between processors and system memory exists. As a result, a substantial amount of latency is incurred for completion of the context switch for handling of an interrupt, task, or process switching For example, an interrupt causes a CPU execution pipeline stall. The contents of the pipeline are usually discarded and the state of CPU registers at the completion of the last executed instruction are preserved by storing them in main memory. Subsequently, the CPU will be directed (or "jump") to a known address determined by the interrupt controller configuration; in some cases this address is provided with the interrupt. Hence, execution at this new address creates a new state by loading all the registers with context related to the interrupt. This load requires reading the new information (usually out of main memory which may have been cached). Often times the new code sequence (the interrupt service routine) will include reading status registers to determine the cause of the interrupt and/or related information that controls the code execution. When an interrupt routine is ended, the unload/reload sequence is repeated this time restoring the state prior to the interrupt by reading the data back off of the "STACK". However, there is a long delay in these unload and reload sequences which usually happens at a frequency slower than that of the actual CPU due to the inherently slower nature of system memory or IO space reads.

For the example of performing a context switch for interrupt processing, the interrupt cycle requires both a context switch and potentially a read of an external device to gain contextual information for proper interrupt handling. A context switch allows for clearing the instruction pipeline, changing the memory configuration to correspond to the new context, and restarting pipeline execution in the next context. Therefore, the impact of interrupt processing can and does continue to increase with processor frequency. Present solutions are inefficient for handling context switches.

BRIEF DESCRIPTION OF THE SEVERAL VIEWS OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference to the following detailed description when read with the accompanying drawings in which:

DETAILED DESCRIPTION OF THE INVENTION

In the following description, for purposes of explanation, numerous details are set forth in order to provide a thorough understanding of the present invention. However, it will be apparent to one skilled in the art that these specific details are not required in order to practice the present invention.

An area of current technological development relates to improving processor and system performance for efficient context switching. As previously described, context switches may be used for interrupt processing, task, or process switching. In one aspect, the time required to execute the sequences for interrupt processing is reduced if the new information is already made available such that the read of new information is a cache hit. In the same aspect, the cache is closer to the CPU, hence, the latency is reduced.

In another aspect, a command-block is to allow the operating system (OS) to pre-configure (or custom configure) the information it will need for the reload for interrupt processing.

Figure 1:
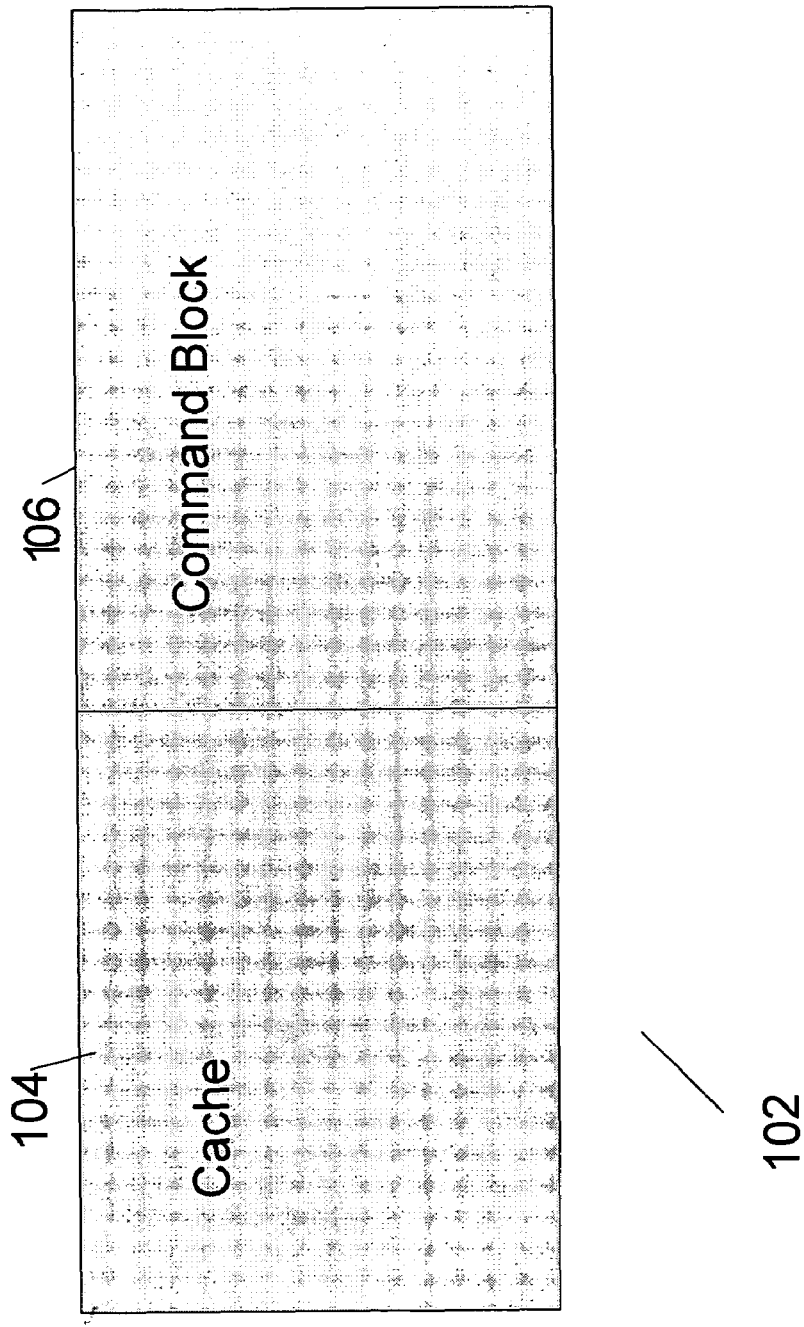
FIG. 1 is an apparatus as utilized by one embodiment of the claimed subject matter.

FIG. 1 is an apparatus as utilized by one embodiment of the claimed subject matter. In one embodiment, the apparatus is a local memory 102 that has at least two sections, a cache section 104 and a command block section 106. In one embodiment, the local memory facilitates a context switch, such as, for processing an interrupt. In the same embodiment, the local memory may be incorporated within a memory controller hub (MCH) or a processor.

In one embodiment, the local memory facilitates an efficient interrupt processing. The command-block is allocated on a per interrupt basis and contains pointers to cache-lines. When the MCH recognizes an interrupt, it uses the pointers in the command-block to prefetch the corresponding cache-lines from the cache section of the local memory, which it loads into its local cache buffer. Thus, when the CPU recognizes an interrupt, the information for the context-switch is already available in cache.

In one embodiment for an IA 32 (Intel Architecture 32 bit) system, a processor requires a vector to an interrupt on a x86 based architecture. For example, the context switch data and interrupt vector that is needed is stored in the Interrupt Descriptor Table (IDT), the Global Descriptor Table (GDT) or the Local Descriptor Table (LDT), and the Interrupt Procedure. In this embodiment, the local memory stores at least the three pointers for IDT, GDT, and LDT. However, the claimed subject matter is not limited to only storing the previous three pointers since the number of pointers in the command block section of the local memory is implementation specific and may be based on several factors, such as, the cache size, system, power requirements, etc.

Figure 2:
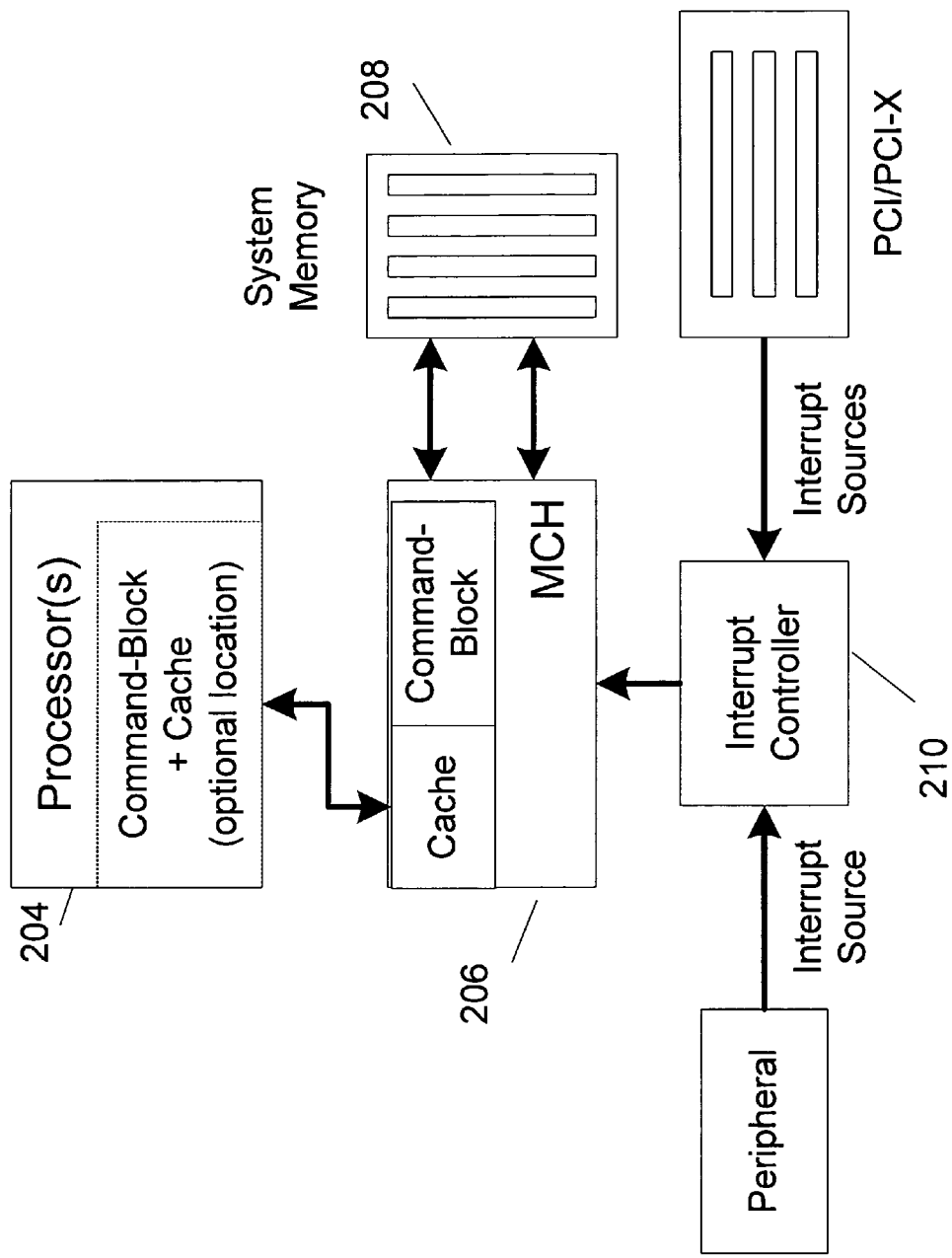
FIG. 2 is a system as utilized by one embodiment of the claimed subject matter.

FIG. 2 is a system as utilized by one embodiment of the claimed subject matter. This system depicts two embodiments for a location of the local memory. In one embodiment, the processor 204 incorporates the local memory to facilitate the context switch. In another embodiment, the MCH 206 incorporates the local memory to facilitate the context switch.

For the embodiment for a MCH that utilizes the local memory with a command block section and a cache section, a processor configures the command-block for each handled interrupt to determine which cache lines to fill during initialization. Subsequently, a MCH detects an interrupt and initiates a prefetch on the indicated address based on the pointers in the command block section. Simultaneously, the MCH signals the CPU; by the time the CPU is ready, the interrupt vector is already in its cache.

In one example of processing an interrupt, the Peripheral and the PCI/PCI-X both function as interrupt sources. The following is an example of the system processing of the interrupt. First, a network card receives a packet. Subsequently, a direct memory access (DMA) of the packet into system memory 208 and signals the processor 204 via the Interrupt Controller 210 and the Memory Control Hub (MCH) 206 that the packet is in memory. In one example, the processor receives the signal from the Interrupt Controller by using an IOAPIC or MSI based interrupt.

The interrupt detection circuitry uses the interrupt number and prefetches the cache-lines as specified in the pointers defined in the corresponding command-block. Simultaneously, the MCH signals the processor that an interrupt has occurred. However, when the processor attempts to vector to the ISR the information required to perform the context switch is already in the local cache; it should not require a system memory access to switch to the ISR context.

Figure 3:
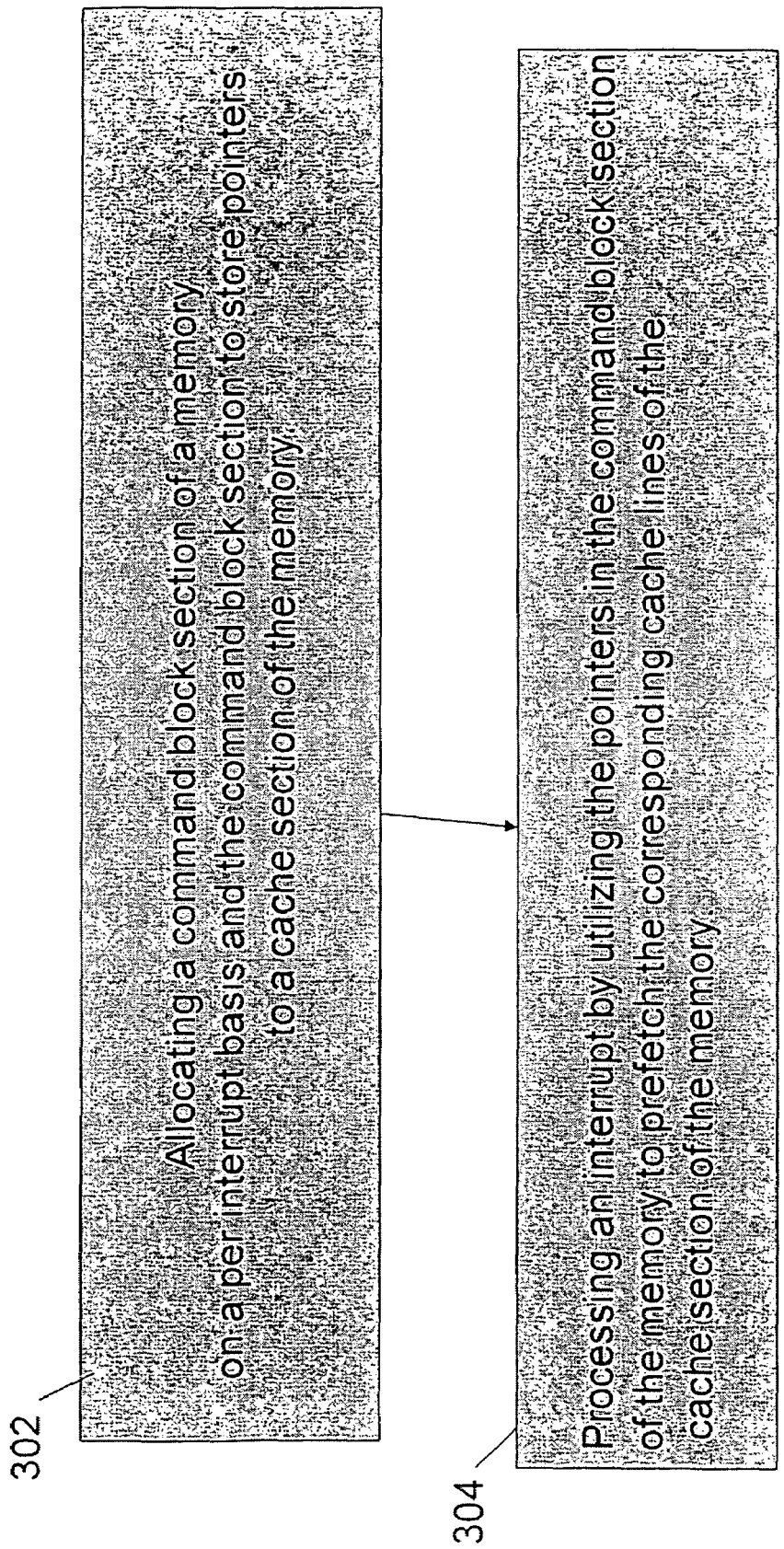
FIG. 3 is a flowchart for a method as utilized by one embodiment of the claimed subject matter.

FIG. 3 is a flowchart for a method as utilized by one embodiment of the claimed subject matter. In one embodiment, the flowchart depicts a method for efficient context switching. For example, the context switching is for facilitating processing an interrupt for a processor. Block 302 depicts allocating a command block section of a memory on a per interrupt basis and the command block section to store pointers to a cache section of the memory. Subsequently, block 304 depicts processing an interrupt by utilizing the pointers in the command block section of the memory to prefetch the corresponding cache lines of the cache section of the memory.

In one embodiment, the interrupts that occur in the system are numbered (indexed). Thus, the interrupts have an index that the CPU uses to determine what interrupt actually happened, such that the CPU can determine which device sent the interrupt and how to process it. In one embodiment, the numbered interrupts are used in the cache and/or the command block. Therefore, the number for each interrupt is used by either hardware or software to determine which area of memory to prefetch, so that when the CPU finally gets to the interrupt context, the memory that it is going to require is already available from a fairly local cache.

Also, the claimed subject matter depicted in the previous Figures may be implemented in software. For example, the software may be stored in an electronically-accessible medium that includes any mechanism that provides (i.e., stores and/or transmits) content (e.g., computer executable instructions) in a form readable by an electronic device (e.g., a computer, a personal digital assistant, a cellular telephone, or any wireless product). For example, a machine-accessible medium includes read only memory (ROM); random access memory (RAM); magnetic disk storage media; optical storage media; flash memory devices; electrical, optical, acoustical, wireless, or other form of propagated signals (e.g., carrier waves, infrared signals, digital signals).

Although the claimed subject matter has been described with reference to specific embodiments, this description is not meant to be construed in a limiting sense. Various modifications of the disclosed embodiment, as well as alternative embodiments of the claimed subject matter, will become apparent to persons skilled in the art upon reference to the description of the claimed subject matter. It is contemplated, therefore, that such modifications can be made without departing from the spirit or scope of the claimed subject matter as defined in the appended claims.

The invention claimed is:

1. A method for facilitating a context switch comprising:
    allocating a command block section of a memory on a per interrupt basis and the command block section to store pointers to a cache section of the memory; and
    utilizing the pointers in the command block section of the memory to prefetch the corresponding cache lines of the cache section of the memory.

2. The method of claim 1 wherein the context switch is for processing an interrupt that utilizes the pointers in the command block section of the memory to prefetch the corresponding cache lines of the cache section of the memory.

3. The method of claim 1 wherein the interrupt is for a central processing unit and the cache section of the memory that stores prefetch of the corresponding cache lines for the pointers in the command block, resides in a memory controller hub (MCH).

4. The method of claim 1 wherein the interrupt is for a central processing unit (CPU) and the cache section of the memory that stores prefetch of the corresponding cache lines for the pointers in the command block, resides in the CPU.

5. The method of claim 1 wherein the pointers are either one of an Interrupt Descriptor Table (IDT), the Global Descriptor Table (GDT) or the Local Descriptor Table (LDT).

6. An article of manufacture comprising:
    a machine-accessible storage medium having a plurality of machine readable instructions, wherein when the instructions are executed by a system, the instructions provide an interrupt service routine for:
    allocating a command block section of a memory on a per interrupt basis and the command block section to store pointers to a cache section of the memory; and
    processing the interrupt by searching for the pointers in the command block section of the memory, and to prefetch the corresponding cache lines of the cache section of the memory based at least in part on the pointers.

7. The article of manufacture of claim 6 wherein the pointers are either one of an Interrupt Descriptor Table (IDT), the Global Descriptor Table (GDT) or the Local Descriptor Table (LDT).

8. The article of manufacture of claim 6 wherein the interrupt is for a central processing unit and the cache section of the memory that stores prefetch of the corresponding cache lines for the pointers in the command block, resides in a memory controller hub (MCH).

9. The article of manufacture of claim 6 wherein the interrupt is for a central processing unit (CPU) and the cache section of the memory that stores prefetch of the corresponding cache lines for the pointers in the command block, resides in the CPU.

10. An apparatus comprising:
    a hardware logic to assign an index for each interrupt;
    the apparatus to request a prefetch from a predetermined section of a main memory, the predetermined section of the main memory based at least in part on the index for the interrupt; and
    a local memory, having a command block section and a cache section, to store the prefetch from the predetermined section of a main memory in the cache section of the local memory, the predetermined section of the main memory based at least in part on the index for the interrupt stored in the command block section of the local memory.

11. The apparatus of claim 10 to receive the interrupt from an interrupt controller or a processor.

12. The apparatus of claim 10 further comprising an interrupt controller to receive the interrupt, wherein the interrupt controller is coupled to a processor via a memory controller hub.

13. The apparatus of claim 10 wherein the local memory resides in a memory controller hub or a processor.

14. A system comprising:
   a processor, the processor to halt execution upon receiving an interrupt;
   a dynamic random access memory, coupled to the processor, to serve as a system memory;
   a local memory, coupled to the processor, with a command block section and a cache section,
   the local memory to allocate the command block section of the local memory on a per interrupt basis and the command block section to store pointers to the cache section of the memory; and
   the system to process the interrupt by searching for the pointers in the command block section of the memory, and to prefetch the corresponding cache lines of the cache section of the memory based at least in part on the pointers.

15. The system of claim 14 wherein the processor configures the command block section of the local memory for each handled interrupt.

16. The system of claim 14 further comprising a MCH that initiates the prefetch of the corresponding cache lines of the cache section of the memory based at least in part on the pointers.

17. The system of claim 14 wherein the local memory resides in a memory controller hub or a processor.

18. The system of claim 14 wherein the pointers are either one of an Interrupt Descriptor Table (IDT), the Global Descriptor Table (GDT) or the Local Descriptor Table (LDT).

19. The system of claim 14 further comprising:
   a logic to assign an index for each interrupt; and
   the logic to request a prefetch from a predetermined section of a main memory, the predetermined section of the main memory based at least in part on the index for the interrupt.

20. The system of claim 14 wherein the logic is an interrupt detection circuitry to facilitate interrupt processing for an interrupt service routine.

\* \* \* \* \*